(12) United States Patent
Herrmann et al.

(10) Patent No.: US 9,063,240 B2
(45) Date of Patent: Jun. 23, 2015

(54) RADIATION DETECTOR ASSEMBLY WITH TEST CIRCUITRY

(75) Inventors: Christoph Herrmann, Aachen (DE); Roger Steadman, Aachen (DE); Oliver Muelhens, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 487 days.

(21) Appl. No.: 13/511,679

(22) PCT Filed: Dec. 7, 2010

(86) PCT No.: PCT/IB2010/055633
§ 371 (c)(1),
(2), (4) Date: May 24, 2012

(87) PCT Pub. No.: WO2011/077302
PCT Pub. Date: Jun. 30, 2011

(65) Prior Publication Data
US 2012/0228486 A1 Sep. 13, 2012

Related U.S. Application Data

(60) Provisional application No. 61/288,557, filed on Dec. 21, 2009.

(51) Int. Cl.
*G01D 18/00* (2006.01)
*G01T 1/24* (2006.01)
(Continued)

(52) U.S. Cl.
CPC ............ *G01T 1/243* (2013.01); *H01J 49/0009* (2013.01); *G01T 7/005* (2013.01); *H04N 5/32* (2013.01); *H04N 5/378* (2013.01); *H04N 17/002* (2013.01); *G01T 1/247* (2013.01)

(58) Field of Classification Search
USPC ........................................ 250/252.1
See application file for complete search history.

(56) References Cited

U.S. PATENT DOCUMENTS 5,243,274 A * 9/1993 Kelsey et al. ................ 714/724
5,943,388 A 8/1999 Tumer
(Continued)

OTHER PUBLICATIONS

Kishishita, T., et al.; Evaluation of Low-Noise Analog Front-End Application Specific Integrated Circuit for Solid-State Detectors; 2008; Japanese Journal of Applied Physics; 47(5)3423-3427.
(Continued)

*Primary Examiner* — Christine Sung (57) ABSTRACT

A radiation detector assembly (20) includes a detector array module (40) configured to convert radiation particles to electrical detection pulses, and an application specific integrated circuit (ASIC) (42) operatively connected with the detector array. The ASIC includes signal processing circuitry (60) configured to digitize an electrical detection pulse received from the detector array, and test circuitry (80) configured to inject a test electrical pulse into the signal processing circuitry. The test circuitry includes a current meter (84) configured to measure the test electrical pulse injected into the signal processing circuitry, and a charge pulse generator (82) configured to generate a test electrical pulse that is injected into the signal processing circuitry. The radiation detector assembly (20) is assembled by operatively connecting the ASIC (42) with the detector array module (40), and the signal processing circuitry (60) of the ASIC of the assembled radiation detector assembly is tested without the use of radiation.

23 Claims, 3 Drawing Sheets

(51) Int. Cl.
*G01T 7/00* (2006.01)
*H04N 5/32* (2006.01)
*H04N 5/378* (2011.01)
*H01J 49/00* (2006.01)
*H04N 17/00* (2006.01)

(56) References Cited

U.S. PATENT DOCUMENTS

| | | | |
|---|---|---|---|
| 6,087,841 | A * | 7/2000 | Bonaccio et al. ........ 324/754.03 |
| 6,333,648 | B1 | 12/2001 | Tumer |
| 7,170,049 | B2 | 1/2007 | Iwanczyk et al. |
| 7,350,108 | B1 * | 3/2008 | Dean et al. ................. 714/27 |
| 7,605,375 | B2 | 10/2009 | Spartiotis et al. |
| 2002/0199142 | A1 * | 12/2002 | Gefen .......................... 714/724 |
| 2003/0004405 | A1 * | 1/2003 | Townsend et al. ............ 600/407 |
| 2003/0090295 | A1 * | 5/2003 | Andersen et al. ................ 327/1 |
| 2004/0061785 | A1 * | 4/2004 | Aufrichtig et al. ....... 348/207.99 |
| 2004/0068699 | A1 * | 4/2004 | Morris et al. .................... 716/4 |
| 2004/0148121 | A1 * | 7/2004 | de Obaldia et al. ........... 702/117 |
| 2006/0011853 | A1 | 1/2006 | Spartiotis et al. |
| 2006/0273250 | A1 * | 12/2006 | Ishitsu et al. ................ 250/252.1 |
| 2008/0263392 | A1 * | 10/2008 | Fujiwara et al. ................ 714/5 |
| 2008/0277589 | A1 * | 11/2008 | Seino et al. .............. 250/370.13 |

OTHER PUBLICATIONS

Kishishita, T., et al.; Initial performance of the two-dimensional 1024-channel amplifier array; 2007; Nuclear Instruments and Methods in Physics Research; A578:218-225.

Posch, C., et al.; CMOS front-end for the MDT sub-detector in the ATLAS Muon Spectrometer—development and performance; Proc. of Seventh Workshop on Electronics for LHC Experiments; pp. 199-203, Sep. 2001.

* cited by examiner

RADIATION DETECTOR ASSEMBLY WITH TEST CIRCUITRY

CROSS REFERENCE TO RELATED APPLICATIONS

This application claims the benefit of U.S. provisional application Ser. No. 61/288,557 filed Dec. 21, 2009, which is incorporated herein by reference.

The following relates to the radiological imaging arts, computed tomography (CT) arts, emission tomography imaging, radiation detector arts, and related arts.

In computed tomography (CT) imaging an x-ray tube transmits x-rays through a subject, and the subject-attenuated x-rays are detected by an oppositely arranged radiation detector assembly. In some CT systems the radiation detector assembly includes scintillators that convert x-ray photons to bursts (i.e., scintillations) of light and photodiodes arranged to detect the light. Such radiation detector assemblies have high sensitivity integrating mode and provide other benefits, but do not allow for exploiting spectral information available in the signal behind the object, or—if kVp-switching is applied—only allow for dual energy imaging, which acquires some spectral information with two different tube spectra.

In order to make the detector capable of fully evaluating this spectral information (i.e. with more than two spectrally resolved measurements), one major approach is to replace the scintillator/photodiode combination with a radiation detector array comprising a (mono-crystalline) direct conversion material such as a material based on the CdTe—ZnTe alloy system; so far only non-crystalline direct conversion materials exhibit sufficient speed to deal with the high count rates in human medical CT imaging. In such radiation detector assemblies, the detector array is pixelated into an array (e.g. 30×30=900) of detector pixels. Each detector pixel includes electrodes, dielectric isolation, or so forth to define an operationally distinct radiation detection element. The pixelated detector array is electrically connected with detector electronics to form a module of the radiation detector assembly. In one approach, the pixelated detector array (or detector crystal) is flip-chip bonded to an application-specific integrated circuit (ASIC) providing the signal processing, or to an array of such ASIC's. The ASIC implements for each of the detector pixels an energy-resolving counting channel, for example including a pulse shaper or other analog processing circuitry, the output of which is connected to an analog-to-digital (A/D) converter, such as a comparator which is a binary analog-to-digital (A/D) converter the output of which is a binary value having one value if no x-ray photon is detected and a second, different value if an x-ray photon is detected. In a different approach, the detector crystal may be bonded to an interposer substrate, and this interposer substrate by be bonded to the readout ASIC, possibly via a further interposer, which is bonded to the ASIC. Such an interposer would be used, if the ASIC exhibits a pixel pitch, which is smaller than the pixel pitch on the detector crystal.

Before using the CT system for medical imaging or other tasks, the radiation detector assembly is tested to ensure it is operating properly. Typically, testing is performed on the assembled radiation detector assembly consisting of a number of these modules including the flip-chip bonded ASIC component or components, by irradiating the radiation detector assembly with x-rays under suitably controlled conditions. The initial testing can be performed either before or after installation in the CT system. After installation, detector array test is repeated occasionally, for example each time the CT system is started up, in order to validate continued operation of the radiation detector assembly within operating specifications. Testing performed after installation in the CT system typically uses the x-ray tube of the CT system as the radiation source for the validation.

These radiation detector assembly testing approaches have substantial disadvantages and limitations. The testing assumes uniformity of the x-ray radiation across the detector array. If this assumption is incorrect, then the test results will reflect the spatial nonuniformity of the x-ray radiation and the radiation detector assembly may fail the test even though it is actually operating within operating specifications. The testing also cannot distinguish between a problem with a detector pixel of the detector array and a problem with downstream signal processing performed by the ASIC. As a result, the remedy when a module of the radiation detector assembly is found by the testing to be outside the operating specifications typically is replacement of the entire module including both the detector array and the ASIC component or components.

The following provides new and improved apparatuses and methods which overcome the above-referenced problems and others.

In accordance with one disclosed aspect, an apparatus comprises an application specific integrated circuit (ASIC) configured for operative connection with a detector array module that converts radiation particles to electrical detection pulses. The ASIC includes signal processing circuitry configured to digitize electrical detection pulses received from the detector array module, and test circuitry configured to perform electrical testing of the signal processing circuitry.

In accordance with another disclosed aspect, an apparatus comprises a detector array module configured to convert radiation particles to electrical detection pulses and an application specific integrated circuit (ASIC) operatively connected with the detector array module. The ASIC includes signal processing circuitry configured to digitize an electrical detection pulse received from the detector array module, and test circuitry configured to inject a test electrical pulse into the signal processing circuitry. The test circuitry includes a current meter configured to measure the test electrical pulse injected into the signal processing circuitry.

In accordance with another disclosed aspect, an apparatus as set forth in the immediate preceding paragraph further includes a processor operatively connected with the ASIC and configured to perform an ASIC test method comprising the operations of: (i) causing the test circuitry to inject a test electrical pulse into the signal processing circuitry; (ii) causing the current meter of the test circuitry to measure the test electrical pulse injected into the signal processing circuitry by the operation (i) and storing the measurement; (iii) storing an output of the signal processing circuitry responsive to the operation (i); and (iv) repeating the operations (i), (ii), and (iii) for a plurality of different values of the test electrical pulse.

In accordance with another disclosed aspect, in an apparatus as set forth in any one of the three immediately preceding paragraphs, the test circuitry includes a charge pulse generator configured to generate a test electrical pulse that is injected into the signal processing circuitry.

In accordance with another disclosed aspect, a method comprises: electrically testing signal processing circuitry of an application specific integrated circuit (ASIC) without the use of radiation; and testing a radiation detector assembly comprising (i) a detector array module configured to convert radiation particles to electrical detection pulses and (ii) the ASIC operatively connected with the detector array module to digitize the electrical detection pulses, the testing of the radiation detector assembly using radiation incident on the detector array module.

In accordance with another disclosed aspect, a method comprises: assembling a radiation detector assembly by operatively connecting an application specific integrated circuit (ASIC) with a detector array module configured to convert radiation particles to electrical detection pulses; and testing signal processing circuitry of the ASIC of the assembled radiation detector assembly without the use of radiation.

In accordance with another disclosed aspect, a method as set forth in either one of the two immediately preceding paragraphs is disclosed, wherein the ASIC includes a charge pulse generator and a current meter, and the testing of signal processing circuitry of the ASIC without the use of radiation comprises injecting a test electrical pulse into the signal processing circuitry using the charge pulse generator of the ASIC and measuring the test electrical pulse injected into the signal processing circuitry using the current meter of the ASIC.

One advantage resides in more probative radiation detector assembly testing.

Another advantage resides in radiation detector assembly testing that can distinguish between failure of a detector array module and a failure of the downstream signal processing implemented by the ASIC component or components.

Another advantage resides in more rapid radiation detector assembly testing.

Further advantages will be apparent to those of ordinary skill in the art upon reading and understanding the following detailed description.

Figure 1:
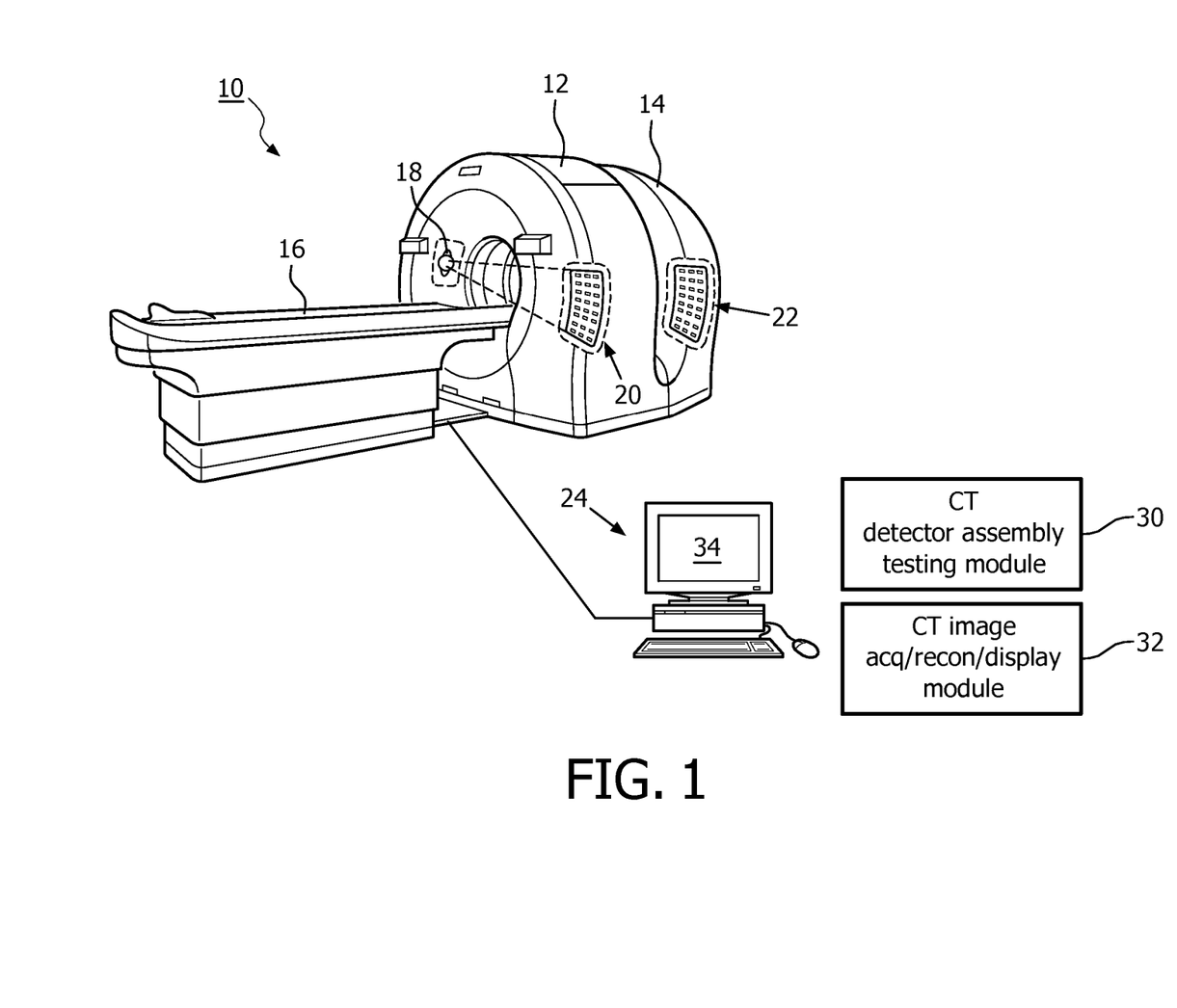
FIG. 1 diagrammatically illustrates an imaging system employing a CT radiation detector assembly including novel features as disclosed herein.

With reference to FIG. 1, an illustrative example is shown of a radiological imaging system suitably employing a radiation detector array with electronics calibration as disclosed herein. The illustrative example is a hybrid PET/CT imaging system 10 which in the illustrated embodiment is a GEMINI™ PET/CT imaging system (available from Koninklijke Philips Electronics N.V., Eindhoven, The Netherlands). The hybrid PET/CT imaging system 10 includes a transmission computed tomography (CT) gantry 12 and a positron emission tomography (PET) gantry 14. The hybrid PET/CT imaging system 10 is a "hybrid" system in that a common lineal subject transport system 16 is arranged to transport an imaging subject into either of the CT or PET gantries 12, 14. The CT gantry 12 is equipped with an x-ray tube 18 and an radiation detector assembly 20 that is sensitive to the x-rays. The internal components 18, 20 are shown by partial cutaway of the CT gantry 12. The PET gantry 14 houses a PET radiation detector assembly 22 (diagrammatically shown in part by partial cutaway of the PET gantry 14) arranged as an annular ring within the PET gantry 14. The PET radiation detector assembly 22 is sensitive to 512 keV radiation emitted by positron-electron annihilation events.

The hybrid imaging system 10 is in operative communication with an illustrated computer 24 or other control electronics that implement a CT radiation detector assembly testing module 30 and a CT image acquisition/reconstruction/display module 32. The CT radiation detector assembly testing module 30 performs testing of the CT radiation detector assembly 20 in conjunction with test circuitry built into the CT radiation detector assembly 20. The CT image acquisition/reconstruction/display module 32 causes the CT gantry 12 including the x-ray tube 18 and the radiation detector assembly 20 to acquire x-ray transmission projection data of a subject and implements filtered backprojection, iterative reconstruction, or another reconstruction algorithm to generate a reconstructed image of the subject from the acquired projection data, and further causes the reconstructed image to be displayed on a display 34 of the computer 24 and/or printed by a printing device (not shown) and/or stored in a suitable memory, or so forth.

Figure 2:
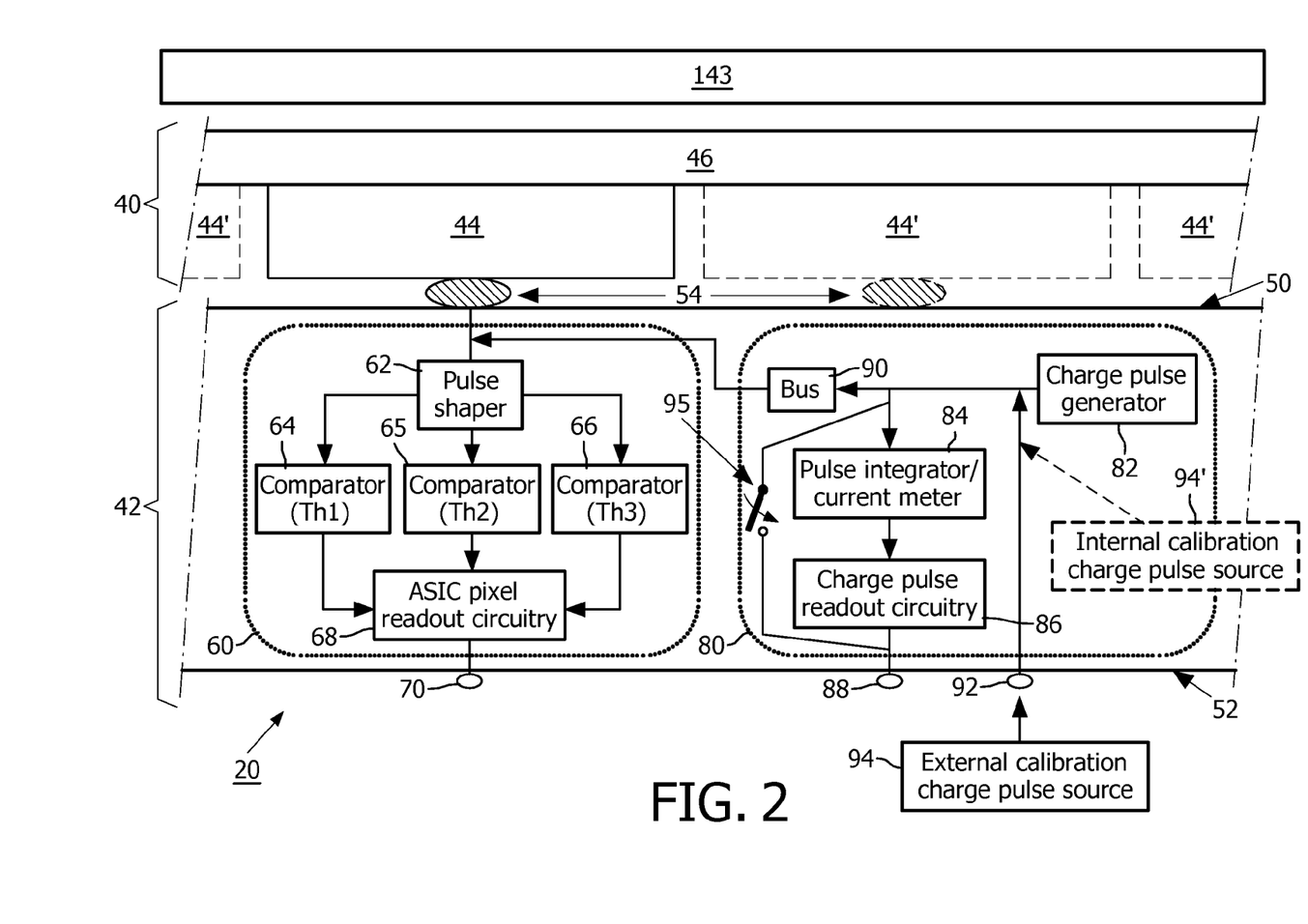
FIG. 2 diagrammatically illustrates the CT radiation detector assembly of FIG. 1.

By way of illustration, the CT radiation detector assembly 20 includes test circuitry as disclosed herein (to be further described with illustrative reference to FIG. 2). More generally, the disclosed radiation detector assemblies with test circuitry, and radiation detector assembly testing methods employing same, can also be implemented in conjunction with the PET radiation detector assembly 22, or with other radiation detector assemblies such as in the radiation detector heads of a gamma camera. Moreover, although the hybrid imaging system 10 is illustrated in FIG. 1 by way of example, the disclosed radiation detector assemblies with built-in test circuitry, and disclosed radiation detector assembly testing methods employing same, can also be employed in conjunction with standalone (rather than hybrid) radiological imaging systems.

Furthermore, as used herein terms such as "radiation particle", "particle of the incident radiation" and similar phraseology are to be broadly construed as encompassing radiation particles such as alpha particles, beta particles, gamma particles, x-ray photons, photons, or so forth. In the illustrative embodiment, illustrative phraseology such as "photon" or "x-ray photon" may be used herein as is appropriate for the illustrative example of radiation in the form of x-rays in a CT system. Similarly, terms such as "photon counting" or "photon counting mode" may be used in describing the illustrative embodiment, and are to be broadly construed as encompassing counting of radiation particles in general, and as such are intended to encompass counting of photons, or x-ray photons, or alpha particles, or beta particles, or so forth as appropriate for the radiation of interest and the type of direct conversion material employed in the detector array of the radiation detector assembly.

With reference to FIG. 2, the radiation detector assembly 20 includes a detector array module 40 and an application-specific integrated circuit 42, both of which are shown in part in diagrammatic sectional view in FIG. 2. The detector array module 40 is pixelated, that is, includes an array of detector pixels, which are denoted in FIG. 2 as an illustrative detector pixel 44 that will be discussed herein as an example and additional detector pixels 44' that are illustrated in FIG. 2 to show the pixelated array. The detector pixels 44, 44' are made of a suitable direct conversion material that converts a radiation particle to an electrical detection pulse. For x-rays, some suitable direct conversion materials include alloys of the CdTe—ZnTe alloy system. The radiation detector array module 40 is pixelated into an array of detector pixels 44, 44', such as by way of example an array of 30×30=900 detector pixels. Each detector pixel 44, 44' includes electrodes, dielectric isolation, or so forth (features not shown) so as to define the detector pixel as an operationally distinct radiation detection element. In the illustrative example, the detector pixels 44, 44' are disposed on a substrate 46 which provides mechanical support and optionally may also include electrically conductive traces or other operative elements.

The illustrative ASIC 42 is generally planar and includes a front surface 50 facing the detector array module 40 and a back surface 44 facing away from the detector array module 40. The front surface 50 of the ASIC 42 is connected with the detector array module 40 by a flip-chip bond 54 comprising a plurality of bonding bumps, two of which are illustrated by way of example in the view in part of FIG. 2. The flip-chip bond 54 provides operative connection between the detector array module 40 and the ASIC 42 such that, again by way of example, an electrical detection pulse generated by an x-ray photon detection in the detector pixel 44 transfers to the ASIC 42. It is to be understood that the ASIC 42 may or may not be coextensive in area with the detector array module 40. For example, in some (coextensive) embodiments the ASIC 42 and the detector array module 40 both have area A×B; on the other hand, in some (non-coextensive) embodiments, the detector array module 40 may have area A×B while the ASIC 42 may have area (A/2)×(B/2). In the latter case, four such ASIC components are suitably provided to span the larger (A×B) area of the detector array module 40.

In the assembled (that is, flip-chip bonded) configuration, each detector pixel has corresponding signal processing circuitry (sometimes referred to herein as an ASIC pixel) for digitizing the electrical detection pulses generated by the detector pixel. To illustrate one example, FIG. 2 shows an ASIC pixel 60 comprising signal processing circuitry for digitizing electrical detection pulses generated by the illustrative detector pixel 44. The ASIC pixel 60 includes a pulse shaper 62 or other analog processing circuitry for shaping the electrical detection pulse received from the detector pixel 44 into a more standardized shape. For example, in some embodiments the pulse shaper 62 shapes the electrical detection pulse to have a Gaussian or other standard shape with a selected pulse full-width-at-half-maximum (FWHM). For a pulse of standardized shape, the pulse height is usually proportional, or approximately proportional, to the energy of the X-ray photon, which caused the pulse. The output of the pulse shaper 62 is input to one or more comparators 64, 65, 66 which serve as binary analog-to-digital (A/D) converters. Each of the comparators 64, 65, 66 has a different threshold: the comparator 64 has a threshold Th1; the comparator 65 has a threshold Th2; and the comparator 66 has a threshold Th3. In general, Th1≠Th2≠Th3, and without loss of generality it is assumed herein that Th1<Th2<Th3. Accordingly, denoting the (shaped) electrical detection pulse height as P, Table 1 shows the outputs of the comparators 64, 65, 66 for various ranges of pulse height P, where an output of "0" indicates P is less than the comparator threshold and an output of "1" indicates P is greater than the comparator threshold. It can be seen that the three comparators or binary A/D converters 64, 65, 66 collectively provide for distinguishable digitization levels. The binary values of Table 1 can be output directly (not illustrated), or as in the illustrated embodiment additional ASIC pixel readout circuitry 68 of the ASIC pixel 60 combines the outputs of the comparators 64, 65, 66 to generate a single analog or digital output readable at a terminal 70 at the back side 52 of the ASIC 42.

TABLE 1

| Pulse height (P) | Comparator 64 (Th1) | Comparator 65 (Th2) | Comparator 66 (Th3) |
|---|---|---|---|
| P < Th1 | 0 | 0 | 0 |
| Th1 < P < Th2 | 1 | 0 | 0 |
| Th2 < P < Th3 | 1 | 1 | 0 |
| P > Th3 | 1 | 1 | 1 |

Although single terminal 70 is shown in FIG. 2 by way of diagrammatic example, the ASIC pixel 60 may have a multi-terminal (e.g., multi-pin) output. For example, the illustrative embodiment having four possible digitized signal output levels may be conveniently represented by a two-bit binary output providing the binary values "00", "01", "10", or "11" to represent the four possible levels. Moreover, although three comparators 64, 65, 66 are shown by way of example, it is to be understood that the number of comparators can be as few as one (thus providing a two-level digital output), or can be two, three, four, or more comparators, with the digital resolution and/or range increasing with increasing number of comparators. Still further, while three comparators 64, 65, 66 operating in parallel are shown by way of example, it is to be understood that other types or configurations of A/D circuitry can be employed.

The illustrative ASIC pixel 60 corresponding to the illustrative detector pixel 44 is shown by way of example, and it is to be understood that the ASIC pixel 60 is duplicated for each detector pixel 44, 44'. For example, if the detector array module 40 is pixelated into an 30×30 array of detector pixels, then there are 900 detector pixels in total, and there are a corresponding 900 ASIC pixels digitizing electrical detection pulses received from the 900 detector pixels. For uniform imaging: the thresholds Th1 of the comparators 64 of the 900 ASIC pixels should be the same (within a specified tolerance); the thresholds Th2 of the comparators 65 of the 900 ASIC pixels should be the same (within a specified tolerance); and the thresholds Th3 of the comparators 64 of the 900 ASIC pixels should be the same (within a specified tolerance). In some embodiments, these thresholds are tunable by a trimming signal delivered to each ASIC pixel, while in other embodiments there is no trimming and the ASIC fabrication is expected to have been sufficiently precise to ensure the same thresholds Th1, Th2, Th3 within the specified tolerances.

With brief reference back to FIG. 1, the CT system includes a CT detector assembly testing module 30 suitably implemented by a programmed processor of the computer 24 or by another digital processor. The testing module 30 operates in conjunction with testing circuitry of the ASIC 42 to test the ASIC pixels to ensure that the thresholds Th1, Th2, Th3 of the pixels are within specified tolerances.

With reference back to FIG. 2, testing circuitry 80 of the ASIC 42 is diagrammatically illustrated. The testing circuitry 80 is configured to perform electrical testing of the signal processing circuitry, that is to say, testing of the ASIC pixels 60. This testing is electrical testing that is independent of operation of the detector array module 40 and does not make use of radiation incident on the detector array module 40. The electrical testing of the signal processing circuitry performed by the testing circuitry 80 can be performed without any radiation incident on the detector array module 40, and indeed can be performed either with or without the detector array module 40 being operatively connected (e.g., flip-chip bonded) to the ASIC 42.

The testing circuitry 80 is configured to inject a test electrical pulse into the signal processing circuitry (for example, into the ASIC pixel 60). Toward this end, the testing circuitry 80 includes a charge pulse generator 82 configured to generate a test electrical pulse (of configurable size) that is injected into the signal processing circuitry. The test electrical pulse simulates an electrical detection pulse received from the detector pixel 44. The charge pulse generator 82 can be variously embodied, for example by a chopped current source, or by a switched capacitor, or so forth. The test circuitry 80 also includes a current meter 84 configured to measure the test electrical pulse injected into the signal processing circuitry. The current meter 84 may, for example, be embodied by a pulse integrator circuit. Optionally, charge pulse readout circuitry 86 is provided to digitize or otherwise process the measurement of the test electrical pulse, and the (optionally digitized) measurement is output at a terminal or terminals 88 disposed at the back side 52 of the ASIC 42.

By reading the output terminal 70 of the ASIC pixel 60 responsive to the injection of the test electrical pulses of a range of different (integrated) sizes as measured by the current meter 84 at the terminal(s) 88, the thresholds Th1, Th2, Th3 of the comparators 64, 65, 66 can be empirically determined by means of a threshold scan, i.e. while injecting pulses of a known size (i.e. gauged using the current meter) each threshold is moved from its maximum value to the minimum value (or vice versa); the threshold setting, at which 50% of the number of generated input pulses is detected is considered the threshold value, which corresponds to the size of the injected pulses. The range of different test electrical pulse sizes preferably spans the expected range of the thresholds Th1, Th2, Th3, or preferably spans the range of the thresholds Th1, Th2, Th3 for an ASIC operating within operating specifications.

In some embodiments, the illustrated test circuitry 80 is duplicated for each ASIC pixel. Thus, for example, if there are 900 detector pixels and a corresponding 900 ASIC pixels, then there would be 900 instances of the illustrated test circuitry 80. Alternatively, fewer instances of the test circuitry 80 can be provided, with some embodiments having as few as a single instance of the test circuitry 80. In such embodiments, as illustrated a bus 90 is provided which is configured to operatively connect the test circuitry 80 with a selected ASIC pixel in order to test the selected ASIC pixel.

Optionally, the pulse integrator or other current meter 84 is gauged or calibrated prior to its use in testing the ASIC pixels. By way of illustrative example of this aspect, an input terminal or terminals 92 are provided on the ASIC 42. The illustrated terminal 92 is on the back side of the ASIC, which in some embodiments may be problematic since it may employ non-standard CMOS contacting—accordingly, the terminal or terminals used for gauging or calibrating the current meter 84 can instead be placed elsewhere. A calibrated current pulse can be input to the terminal(s) 92 by an external calibration charge pulse source 94. The calibrated current pulse input at the terminal(s) 92 feeds into the pulse integrator/current meter 84 which measures the calibrated current pulse, and the measurement is digitized by the readout circuitry 86 and output at the terminal(s) 88. In this way, the pulse integrator/current meter 84 can be calibrated, and the calibration information is suitably stored in a memory or data storage accessible by the CT detector assembly testing module 30. The memory or data storage can be part or accessible by the computer 24 that embodies the testing module 30, or can be a memory element included in the ASIC 42 (not illustrated).

Alternatively, the pulse integrator or current meter 84 is gauged by an internal current source or charge pulse generator 94' (shown in phantom), the signal of which is measured (and thus gauged) via the output terminal 88 on the ASIC 42 using a calibrated external current meter or pulse integrator (not shown). During this calibration, a bypass shunt 95 bypasses the readout elements 84, 86 so that the output terminal 88 directly outputs the signal from the internal current source or charge pulse generator 94'. Once the internal current source or charge pulse generator 94' is gauged, the bypass shunt 95 is opened and the pulse integrator or current meter 84 is used to measure this known current or charge pulse from the gauged internal source 94' and thus gauge the pulse integrator or current meter 84.

Figure 3:
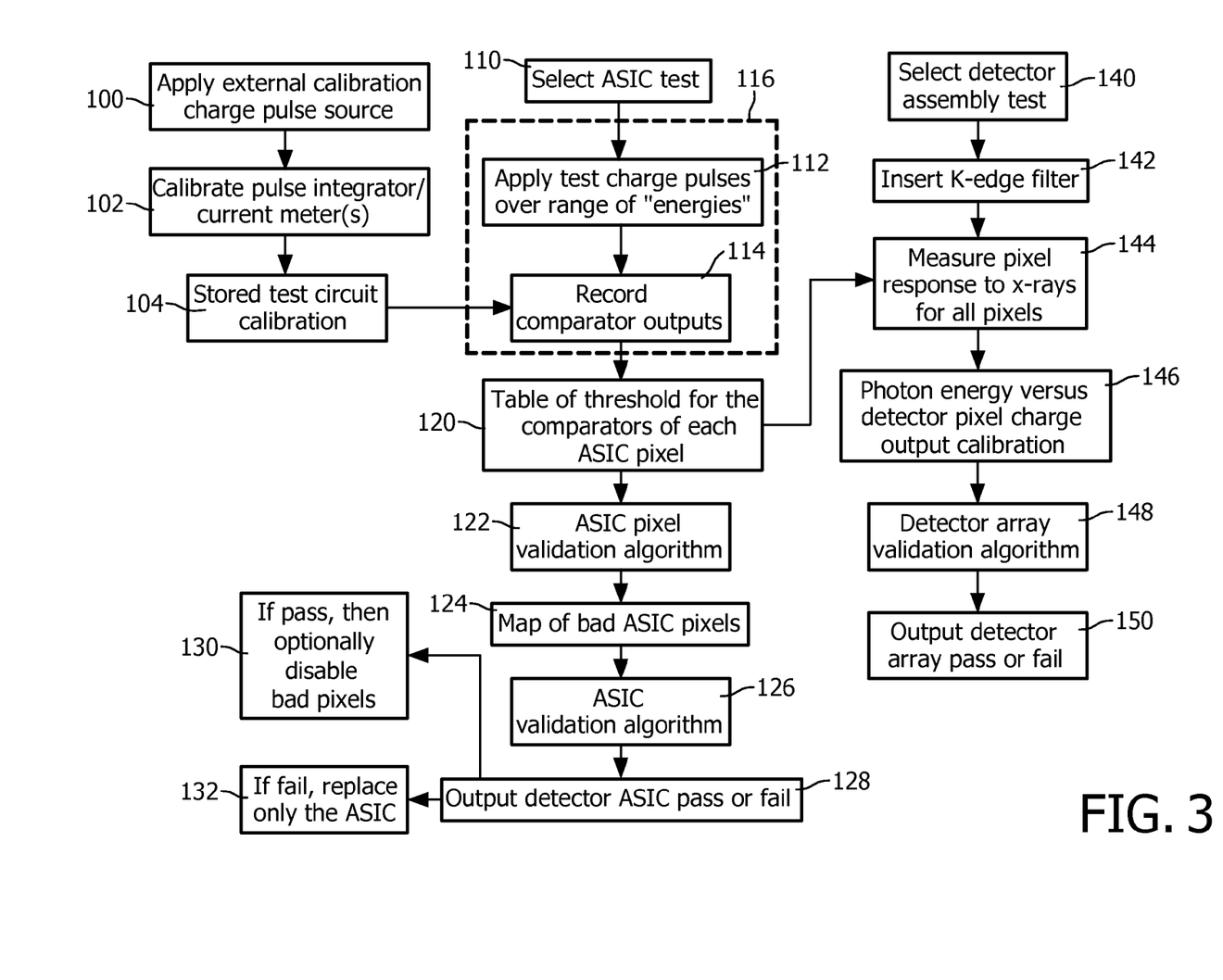
FIG. 3 diagrammatically illustrates a testing method for testing the CT radiation detector assembly of FIGS. 1 and 2.

With continuing reference to FIGS. 1 and 2 and with further reference to FIG. 3, a suitable testing procedure for testing the radiation detector assembly 20 is described. The testing procedure is performed by the detector assembly testing module 30 operating in conjunction with the testing circuitry 80 of the ASIC 42. In an initial calibration operation, the external calibration charge pulse source 94 is applied to the terminal(s) 92 in an operation 100, the pulse integrator/current meter 84 is calibrated in an operation 102, and the calibration information is stored in an operation 104. The calibration operations 100, 102, 104 generally do not need to be performed very often, assuming that the pulse integrator/current meter 84 does not drift significantly over time. In some embodiments, the calibration operations 100, 102, 104 are performed at the factory before installation of the radiation detector assembly 20 in the CT gantry 12. The calibration operations 100, 102, 104 can be performed either before or after the ASIC 42 is flip-chip bonded to the detector array module 40. In a simplified gauging procedure, a constant current (rather than a pulsed current) is injected and measured by the current meter.

Once the calibration operations 100, 102, 104 are completed, the ASIC test can be performed. Typically, the ASIC test is performed at regular intervals, for example each morning when the CT gantry is started up, or once a week, or on some other schedule. The ASIC test can be performed either before or after the ASIC 42 is flip-chip bonded to the detector array module 40, but during routine operations it is convenient to perform the ASIC test on the assembled radiation detector assembly 20 (that is, with the ASIC 42 flip-chip bonded to the detector array module 40), and with the radiation detector assembly 20 installed on the CT gantry 12. The radiologist or other user initiates the ASIC test in an operation 110, for example by selecting "ASIC test" in a menu displayed on the screen 34 of the computer 24. Once initiated, the test circuitry 80 (and more particularly the charge pulse generator 82) applies test charge pulses in an operation 112 to an ASIC pixel over a range of "energies" expected to span the range of thresholds Th1, Th2, Th3, and the comparator outputs (or, more generally, the responses of the ASIC pixel to the applied test charge pulses) are recorded in an operation 114. As diagrammatically indicated 116, the operations 112, 114 are repeated for all ASIC pixels of the ASIC 42, for example by sequentially switching the testing over all the ASIC pixels via the bus 90. In the recording operations 114, the test charge pulses are measured by the pulse integrator/current meter 84 as calibrated by the stored calibration information 104, so that the thresholds Th1, Th2, Th3 for each ASIC pixel can be quantitatively determined so as to generate a table of thresholds 120 for the comparators of each ASIC pixel.

The thresholds information 120 can be used in various ways. In one approach, an ASIC pixel validation algorithm 122 compares the thresholds Th1, Th2, Th3 of each ASIC pixel against an operating specification, so as to identify a map 124 of bad pixels (that is, pixels for which at least one of the thresholds Th1, Th2, Th3 is not within the operating specification). The map 124 serves as input to an ASIC validation algorithm 126 that determines whether the ASIC 42 is considered defective. In making this assessment, the ASIC validation algorithm 126 preferably considers not only the total number of bad ASIC pixels, but also their distribution over the map 124. For example, the ASIC 42 may pass the validation test if the bad ASIC pixels are isolated from each other and are distributed substantially randomly across the face of the radiation detector assembly 20; contrawise, the ASIC 42 may fail the validation test if the same number of bad ASIC pixels are grouped together on the face of the radiation detector assembly 20 so as to create a relatively large region of inaccurate ASIC pixels. Other factors that may be taken into account by the ASIC validation algorithm 126 include: the deviation of the thresholds of bad ASIC pixels from the operating specification (larger deviations biasing toward ASIC validation failure); absolute locations of the bad ASIC pixels (for example, bad ASIC pixels may be more tolerable at the periphery of the detector face as compared to the center of the detector face); and so forth.

The ASIC validation algorithm 126 generates an output 128, for example on the computer display 34 (optionally including a displayed graphical map of the ASIC pixels with any bad ASIC pixels marked), informing the radiologist or other user whether the ASICs 42 have passed or failed the ASIC test. In some embodiments, if the ASIC test is passed then an operation 130 is performed in which the bad ASIC pixels are disabled or their output is simply ignored. This can be done in software (for example, by maintaining a table of bad pixels that is accessed by the CT image acquisition/reconstruction/display module 32 to discard data acquired by bad pixels) or by hardware approaches such as including a disable circuit (not illustrated) in the signal processing circuitry of each ASIC pixel that sets the pixel output to all zeros when the disable setting is turned on for that ASIC pixel.

If the output 128 informs the radiologist or other user that an ASIC 42 has failed the ASIC test, the radiologist or other user suitably takes remedial action. Advantageously, the radiologist or other user knows that the ASIC 42 is defective—in contrast, a test performed on the radiation detector assembly 20 as a whole cannot distinguish between a defect in the detector array module 40 and a defect in the ASIC 42. Accordingly, responsive to the test output 128 indicating that the ASIC 42 is defective, the radiologist or other user suitably performs maintenance on the radiation detector assembly 20 comprising replacing the defective ASIC 42 with a different ASIC, and repeating the ASIC test to validate the newly installed ASIC. This avoids unnecessarily replacing the detector array module 40, which is typically a costly component.

With continuing reference to FIGS. 1, 2, and 3, in some embodiments the results of the ASIC test, and in particular the table of thresholds 120 of the comparators of the ASIC pixels, is as information for testing the detector array module 40. In brief, since the table of thresholds 120 informs respective to variations in the ASIC pixels, any remaining variation observed for the radiation detector assembly 20 as a whole is attributable to variations in the pixels 44, 44' of the detector array module 40.

Toward this end, after completion of the ASIC test the radiologist optionally initiates the detector assembly test in an operation 110, for example by selecting "Detector assembly test" in a menu displayed on the screen 34 of the computer 24. Unlike the ASIC test, the detector assembly test uses radiation incident on the detector array module 40. In some embodiments, the detector assembly test is performed with the assembled radiation detector assembly mounted in the CT gantry 12, and the radiation incident on the detector array module 40 is provided by the x-ray tube 18. To provide a well-defined spectrum for the radiation incident on the detector array module 40, a filter such as a K-edge filter or other spectral filter is optionally inserted in an operation 142. In a suitable approach, once the user selects the detector assembly test in operation 140, the computer displays instructions to load the filter and pauses until the user indicates that a filter has been loaded. As shown in FIG. 2, a K-edge filter 143 is suitably interposed between the radiation-sensitive face of the detector array module 40 and the x-ray tube 18.

Once the K-edge filter is loaded (or, more generally, radiation is established which is incident on the detector array module 40 and which has a spectrum with a suitable edge or other spectral feature enabling identification of the incident photon energy), the pixel response to the x-rays is measured for all the pixels in an operation 144. In the measurement operation 144, the term "pixel" denotes (by way of example) the operational combination of the detector pixel 44 and its corresponding ASIC pixel 60. In an operation 146, a photon energy versus detector pixel charge output calibration is determined for each pixel of the detector assembly 20. In determining this calibration, the table of thresholds 120 for the ASIC pixel comparators 64, 65, 66 is utilized so that the pixel charge output as measured by the digitizing circuitry 64, 65, 66 is precisely known. Additionally, the actual x-ray photon energy is precisely known due to the use of the k-edge filter 143 (or, more generally, due to a known spectrum of the radiation incident on the detector during the measurement operation 144). As a result, the calibration relating photon energy and detector pixel charge output is readily determined (It will be appreciated that this calibration cannot be readily determined without reference to the table of thresholds 120 for the ASIC pixel comparators 64, 65, 66, because without this information 120 it is not possible to differentiate variations in the detector pixel charge output of the detector pixel 44 from variations in the thresholds Th1, Th2, Th3 of the comparators 64, 65, 66.) This relationship can be used for correction purposes in the subsequent data evaluation, e.g. image reconstruction.

The detector pixel calibrations generated by the operation 146 are used by a detector array validation algorithm 148 to validate the detector array module 40. This validation suitably considers factors such as the variance of the detector pixel charge output across the detector array module 40 for the (spectrally well-defined) radiation incident on the detector array module 40, the location of the variance (as with the ASIC validation, a variance in the detector pixel charge output at the center of the detector area is more problematic than a similar variance at the periphery), and so forth. The detector array validation algorithm 148 provides a pass-or-fail output 150, which is suitably displayed on the computer display 34. If the output 150 of the detector array validation algorithm 148 indicates a defective detector array, the radiologist or other user can effect the maintenance by replacing only the detector array module 40 while keeping the ASIC 42 (assuming that the ASIC passed the ASIC test of operation 110 and forward). Again, this can reduce maintenance costs by avoiding replacement of the costly ASIC 42 assuming a reversible bonding method between detector crystal and readout ASIC.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

Having thus described the preferred embodiments, the invention is now claimed to be:

1. An apparatus comprising:
   an application-specific integrated circuit (ASIC) configured for operative connection with a detector array module that converts radiation particles to electrical detection pulses, the ASIC including:
   signal processing circuitry configured to digitize electrical detection pulses received from the detector array wherein the signal processing circuitry includes comparators, test circuitry configured to perform electrical testing of the signal processing circuitry, wherein the electrical testing comprises determining parameters of the signal processing circuitry including at least thresholds of comparators.

2. The apparatus as set forth in claim 1, wherein the test circuitry includes:
a charge pulse generator configured to generate a test electrical pulse that is injected into the signal processing circuitry.

3. The apparatus as set forth in claim 2, wherein:
the signal processing circuitry comprises at least one comparator; and
the charge pulse generator is configured to generate the test electrical pulse with a value that is selectable over a range of values spanning an expected range of thresholds of the at least one comparator.

4. The apparatus as set forth in claim 3, wherein the at least one comparator comprises a plurality of comparators with different thresholds.

5. The apparatus as set forth in claim 1 wherein the signal processing circuitry comprises a plurality of ASIC pixels, each ASIC pixel comprising signal processing circuitry configured to digitize an electrical detection pulse received from a corresponding detector pixel of the detector array module, and the test circuitry comprises:
a bus configured to operatively connect the test circuitry with a selected ASIC pixel in order to test the selected ASIC pixel.

6. An apparatus comprising:
a detector array module configured to convert radiation particles to electrical detection pulses; and
an application-specific integrated circuit (ASIC) operatively connected with the detector array, the ASIC including:
signal processing circuitry configured to digitize an electrical detection pulse received from the detector array,
test circuitry configured to inject a test electrical pulse into the signal processing circuitry, the test circuitry including a current meter configured to measure the test electrical pulse injected into the signal processing circuitry.

7. The apparatus as set forth in claim 6, wherein the ASIC further comprises one of:
an externally accessible calibration charge input terminal, the current meter being further configured to measure a calibration charge that is input at the externally accessible calibration charge input terminal, and
an externally accessible calibration output terminal, a current or current pulse of an internal test structure being configured to output at the output terminal in order to be gauged with an external current meter or pulse integrator connected with the calibration output terminal, so that after gauging the internal test structure the internal current meter can be gauged using the internal test structure.

8. The apparatus as set forth in claim 6, wherein the current meter comprises a pulse integrator.

9. The apparatus as set forth in claim 6, further comprising:
a flip-chip bond between the detector array module and the ASIC.

10. The apparatus as set forth in claim 6, further comprising:
a processor operatively connected with the ASIC and configured to perform an ASIC test method comprising the operations of:

(i) causing the test circuitry to inject a test electrical pulse into the signal processing circuitry,
(ii) causing the current meter of the test circuitry to measure the test electrical pulse injected into the signal processing circuitry by the operation (i) and storing the measurement,
(iii) storing an output of the signal processing circuitry responsive to the operation (i), and
(iv) repeating the operations (i), (ii), and (iii) for a plurality of different values of the test electrical pulse.

11. The apparatus as set forth in claim 10, wherein:
the signal processing circuitry comprises a plurality of ASIC pixels, each ASIC pixel comprising signal processing circuitry configured to digitize an electrical detection pulse received from a corresponding detector pixel of the detector array module; and
the ASIC test method comprises the further operations of:
(v) repeating the operations (i), (ii), (iii), and (iv) for the plurality of ASIC pixels, and
(vi) classifying the ASIC pixels based on the stored measurements of the test electrical pulses and the stored outputs of the signal processing circuitry generated by the operations (i), (ii), (iii), (iv), and (v).

12. The apparatus as set forth in claim 11, wherein the ASIC test method comprises the further operations of:
(vii) classifying the ASIC based on the classifications of the ASIC pixels generated by the operation (vi).

13. A method comprising:
electrically testing signal processing circuitry of an application-specific integrated circuit (ASIC) without the use of radiation, wherein the signal processing circuitry of the ASIC includes comparators; and
testing a radiation detector assembly comprising (i) a detector array module configured to convert radiation particles to electrical detection pulses and (ii) the ASIC operatively connected with the detector array to digitize the electrical detection pulses, the testing of the radiation detector assembly using radiation incident on the detector array, wherein the electrical testing comprises determining parameters of the signal processing circuitry including at least thresholds of the comparators.

14. The method as set forth in claim 13, wherein the electrical testing of signal processing circuitry of the ASIC is performed with the ASIC operatively connected with the detector array module.

15. The method as set forth in claim 13, wherein the testing of the radiation detector assembly comprises:
generating calibration data relating radiation particle energy and pixel charge output of pixels of the detector array module based on:
parameters of the signal processing circuitry of the ASIC determined by the electrical testing and
a spectrum of the radiation incident on the detector array.

16. The method as set forth in claim 15, wherein the testing of the radiation detector assembly further comprises:
generating the radiation incident on the detector array module using an x-ray tube; and
defining at least one feature of the spectrum of the radiation incident on the detector array by interposing a spectral filter between the x-ray tube and the detector array.

17. The method as set forth in claim 13, wherein the electrical testing of signal processing circuitry of the ASIC and the testing of the radiation detector assembly are both performed with the ASIC operatively connected with the detector array to define the radiation detector assembly and with the radiation detector assembly installed in a computed tomography (CT) system, and the testing of the radiation detector assembly comprises:

generating the radiation incident on the detector array using an x-ray tube of the CT system that is also used in CT imaging data acquisition performed by the CT system.

18. The method as set forth in claim 13, wherein: the ASIC includes a charge pulse generator and a current meter; and the testing of signal processing circuitry of the ASIC without the use of radiation comprises injecting a test electrical pulse into the signal processing circuitry using the charge pulse generator of the ASIC and measuring the test electrical pulse injected into the signal processing circuitry using the current meter of the ASIC.

19. A method comprising:

assembling a radiation detector assembly by operatively connecting an application-specific integrated circuit (ASIC) with a detector array module configured to convert radiation particles to electrical detection pulses; and testing signal processing circuitry of the ASIC of the assembled radiation detector assembly without the use of radiation with test circuitry that includes a current meter configured to measure a test electrical pulse injected into the ASIC.

20. The method as set forth in claim 19, further comprising:

responsive to the testing indicating the ASIC is defective, performing maintenance on the radiation detector assembly comprising replacing the defective ASIC and repeating the testing.

21. The method as set forth in claim 19, further comprising:

testing the detector array module of the radiation detector assembly using radiation incident on the detector array of the assembled radiation detector assembly.

22. The method as set forth in claim 19, further comprising:

generating a displayed graphical map of pixels of the ASIC with any bad pixels marked.

23. The method as set forth in claim 19, further comprising:

disabling any pixels of the ASIC that fail the testing.

* * * * *